United States Patent
Lundeberg et al.

(10) Patent No.: US 6,981,308 B2
(45) Date of Patent: Jan. 3, 2006

(54) SUPPORT MEMBERS INSIDE STATOR SLOTS OF A ROTATING ELECTRIC MACHINE AND METHOD OF MOUNTING THESE SUPPORT MEMBERS

(75) Inventors: Olof Lundeberg, Vaesteras (SE); Pentti Virtanen, Hallstahammar (SE)

(73) Assignee: ALSTOM Technology LTD, Baden (CH)

( * ) Notice: Subject to any disclaimer, the term of this patent is extended or adjusted under 35 U.S.C. 154(b) by 0 days.

(21) Appl. No.: 10/637,569

(22) Filed: Aug. 11, 2003

(65) Prior Publication Data

US 2004/0056551 A1 Mar. 25, 2004

(30) Foreign Application Priority Data

Aug. 22, 2002 (SE) .............................. 0202489

(51) Int. Cl.
*H02K 15/16* (2006.01)

(52) U.S. Cl. ............................. 29/596; 29/870; 29/871; 29/606; 29/735; 310/179; 310/184; 310/214; 310/196; 310/195

(58) Field of Classification Search ................ 310/179, 310/184, 214, 196, 195, 254, 52, 64; 29/596, 29/870, 871, 606, 735
See application file for complete search history.

(56) References Cited

U.S. PATENT DOCUMENTS 4,429,244 A * 1/1984 Nikitin et al. .............. 310/254
5,807,447 A * 9/1998 Forrest .......................... 156/51
6,278,217 B1 * 8/2001 Kliman et al. .............. 310/254
6,389,679 B1 * 5/2002 Kliman et al. ................ 29/596

FOREIGN PATENT DOCUMENTS

WO 97/45935 12/1997

OTHER PUBLICATIONS

Search Report from SE 0202489–1 (Feb. 26, 2003).

* cited by examiner

*Primary Examiner*—Darren Schuberg
*Assistant Examiner*—Iraj A. Mohandesi
(74) *Attorney, Agent, or Firm*—Cermak & Kenealy, LLP; Adam J. Cermak

(57) ABSTRACT

A rotating electric machine (1) has a rotor, a stator (2), and stator windings (3, 4). The windings (3, 4) include high voltage cable drawn through slots (5, 6) in the stator (2). Support members (8) are arranged inside the slots (5, 6) along and in contact with the windings (3, 4), said support members (8) comprising a hose (8') with a substantially triangular cross-section. A wire (9) is extending through and being attached to each support member (8). When mounting the support members (8) air inside a support member (8) is evacuated in order to shrink the support member (8). Then the wire (9) extending through the support member (8) is used to pull the evacuated support member (8) into a slot (5, 6), whereupon the evacuated support member (8) is expanded by releasing the vacuum inside in order to make it clamp a cable inside a slot (5, 6) of the stator (2).

3 Claims, 1 Drawing Sheet

SUPPORT MEMBERS INSIDE STATOR SLOTS OF A ROTATING ELECTRIC MACHINE AND METHOD OF MOUNTING THESE SUPPORT MEMBERS

The present invention concerns a rotating electric machine having a rotor, a stator, and stator windings, the windings including high voltage cable drawn through slots in the stator, wherein support members are arranged inside the slots along and in contact with the windings, said support members comprising a hose with a substantially triangular cross-section. The present invention also concerns a method of mounting the support members inside the slots.

A rotating electric machine according to the preamble is known from WO 9745935, which hereby is incorporated by reference. Machines of that kind use high voltage cables for their stator windings. These cables comprise at least two semi conducting layers and solid insulation between these layers.

When the cables are drawn through the slots of the stator there always remains a certain clearance between each cable and the slot walls as well as between the cables among each other. The clearances make the cables loose, which would lead to the cables getting damaged by wearing. In order to avoid that support members are inserted along and in contact with the cables.

Some of the support members according to the state of the art are hoses with a cross-section fitting a typical clearance, i.e. essentially triangular. These hoses are inserted in a collapsed shape, whereupon they are expanded by being filled with e.g. a pressure-hardened epoxy. Thus each hose acquires a substantially triangular cross-section with a first surface supported by a slot wall, a second surface abutting a first adjacent cable inside the slot, and a third surface abutting a second adjacent cable inside the slot. In that way all the cables inside a slot can be fixed and damage due to wear be avoided.

A major problem of the known hoses is that it can be difficult to insert them in a correct manner along the cables in the slots. If for instance a collapsed hose is twisted inside a slot, it is no longer possible to fill it in a appropriate manner, which means that it cannot fulfil its function. Another problem is the need to fill each hose after its mounting, which requires tightening of one end of the hose and connecting its other end to an injector. Yet another problem is that, when inserting a hose into a slot, it is possible to expand it in a way that causes damage to the hose or makes it to small to fit the clearance inside the slot.

The object of the present invention is to obviate the problems with the solution according to WO 9745935.

This object is solved by a rotating electric machine according to the preamble, the machine being characterized by a wire extending through and being attached to each support member.

In to one embodiment of the machine according to the invention an insertion part of the wire, said part having a length corresponding to at least the length of a slot, protrudes at an insertion end of each support member.

Preferably said wire is attached to each support member by means of a ring which is clamped onto said insertion end.

Preferably a shrinking tube is placed on said insertion end covering said ring.

In an alternative embodiment of the machine according to the invention said wire consists of at least one reinforcement thread being embedded in a hose wall.

Preferably said hose wall has a lip extending along said wall and having a substantially triangular cross-section.

Most preferably said at least one reinforcement thread is embedded in said lip.

The object is also solved with the aid of a method of mounting a support member in a rotating electric machine having a rotor, a stator, and stator windings, the windings including high voltage cable drawn through slots in the stator, wherein support members are arranged inside the slots along and in contact with the windings, said support members comprising a hose with a substantially triangular cross-section. The method is characterized by evacuating air inside a support member in order to shrink the support member, by using a wire extending through the support member to pull the evacuated support member into a slot, and by expanding the evacuated support member by releasing the vacuum inside in order to make it clamp a cable inside a slot of the stator.

In one embodiment of the method according to the invention said wire is inserted into a support member and attached to an insertion end of it by means of a ring which is clamped on said end.

Preferably a shrinking tube is placed on said insertion end and shrunk to tightly enclose said ring.

Embodiments of the invention are described in the following with reference to the accompanying drawing.

Figure 1:
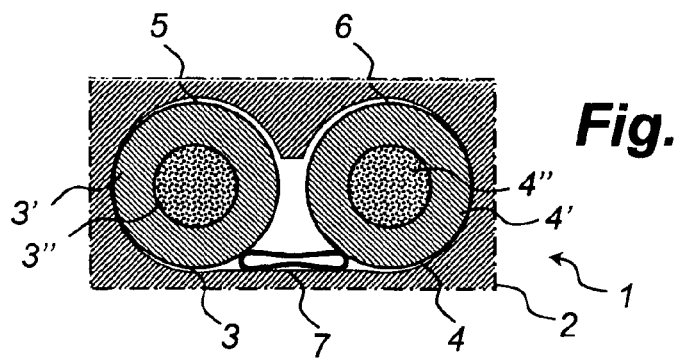
FIG. 1 is a cross-sectional view of a part of a stator of a rotating electric machine showing a known support member.
Figure 2:
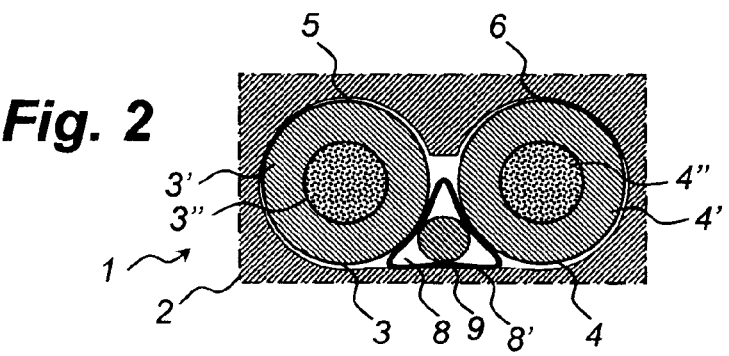
FIG. 2 is a cross-sectional view of a part of a stator of a rotating electric machine showing a support member according to the invention.

In FIGS. 1 and 2 the same part of a rotating electric machine 1 is shown, the machine having a rotor (not shown), a stator 2, and stator windings 3,4. The windings 3, 4 include high voltage cable having an insulating coating 3', 4' and a core 3", 4" of conductors. The windings 3, 4 are drawn through slots 5, 6 in the stator 2, the slots being interconnected and a little wider than the windings 3, 4.

In order to lock the windings 3, 4 inside the slots 5, 6 a support member 7, 8 is arranged within the slots 5, 6, to be precise inside the interconnecting part of the slots 5, 6 as can be seen in the drawing.

The prior art support member 7, shown in FIG. 1, comprises a hose which is shown in a collapsed state in which it is able to be threaded through the slots 5, 6 between the windings 3, 4. After being threaded through the hose shaped support member 7 is sealed at one end and filled with a hardening mass, such as epoxy resin. The mass is makes the support member 7 expand, locking the windings 3, 4 inside the slots 5, 6.

The support member 8 according to the invention does not have to be filled with e.g. epoxy resin. It comprises a hose 8' with a substantially triangular cross-section (cf. FIG. 2) well fitting the interconnecting part of the slots 5, 6 through which it extends in contact with the windings 3, 4.

Figure 3:
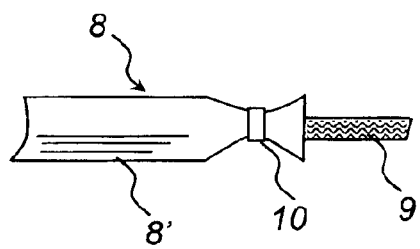
FIGS. 3 and 4 are elevational views of an end of the support member according to the invention.
Figure 4:
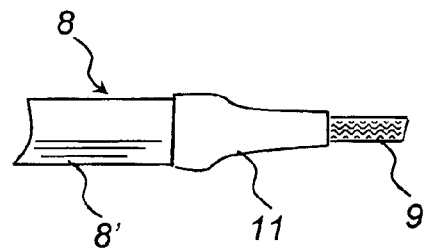

In order to thread the support member 8 through the stator slots 5, 6 a wire 9 extends there through, the wire 9 being made of a non-stretchable material, such as steel, and having at least twice the length of a stator slot 5, 6. The wire is attached to the front or insertion end support member 8 by means of a ring 10 (cf. FIG. 3) which is clamped onto said insertion end. A shrinking tube 11 is thereafter placed on said insertion end (cf. FIG. 4) covering said ring 10 and tightening the joint between the wire 9 and the support member hose 8'. Thus it is possible to evacuate the support member hose 8' from its trailing end and to shrink it in order to facilitate insertion thereof.

After inserting the support member 8 with the aid of the wire 9, vacuum is released and the wire 9 as well as protruding parts of the support member hose 8' are cut. The support member 8 now reassumes its initial triangular cross-section shape and supports the stator windings 3, 4 aided by the remaining wire 9 inside.

Figure 5:
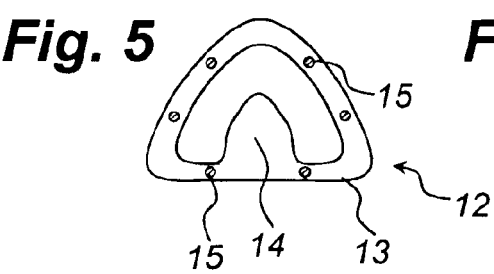
FIGS. 5 and 6 are cross-sectional views of alternative support member designs.

In FIG. 5 a first alternative embodiment of a support member 12 is shown. It comprises a hose 13 with a substantially triangular cross-section, having a lip 14 extending along one of the hose walls. The purpose of the lip 14 is to help the hose 13 support the stator windings 5, 6 as does the wire in the previous embodiment. In this embodiment the wire consists of several reinforcement threads 15 being embedded in the hose walls.

Figure 6:
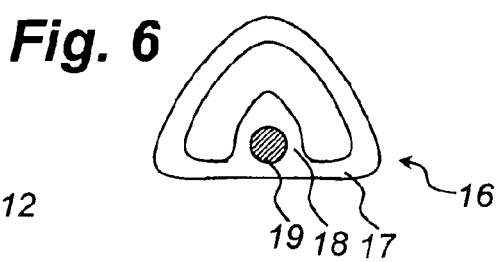

In FIG. 6 a second alternative embodiment of a support member 16 is shown. It comprises a hose 17 with a substantially triangular cross-section, having a lip 18 extending along one of the hose walls. In this embodiment the wire consists of one reinforcement thread 19 being embedded in said lip 18.

The invention is not limited to the embodiments described above and can be varied in different ways within the scope of the accompanying claims.

What is claimed is:

1. A method of mounting a support member in a rotating electric machine having a rotor, a stator, and stator windings, the windings including high voltage cable drawn through slots in the stator, wherein support members are arranged inside the slots along and in contact with the windings, said support members including a hose with a substantially triangular cross-section, the method comprising:

evacuating air inside a support member to shrink the support member;

pulling the evacuated support member with a wire extending through the support member into a slot; and expanding the evacuated support member by releasing the vacuum inside the support member to make the support member clamp a cable inside a slot of the stator.

2. A method according to claim 1, further comprising:

inserting said wire into a support member; and clamping an insertion end of said support member with a ring to attach said wire.

3. A method according to claim 2, further comprising:

placing a shrinking tube on said insertion end; and shrinking said tube to tightly enclose said ring.

* * * * *